United States Patent
Schöffmann et al.

(10) Patent No.: US 9,635,455 B2
(45) Date of Patent: Apr. 25, 2017

(54) SPEAKER WITH GRAINED ZEOLITE MATERIAL IN DEEP-DRAWN FOIL RESONANCE VOLUME

(71) Applicants: Michael Schöffmann, Baden (AT); Helmut Wasinger, Hinterbrühl (AT); Josef Herold, Wulkaprodersdorf (AT); Mark Hannah, Bad Fischau-Brunn (AT)

(72) Inventors: Michael Schöffmann, Baden (AT); Helmut Wasinger, Hinterbrühl (AT); Josef Herold, Wulkaprodersdorf (AT); Mark Hannah, Bad Fischau-Brunn (AT)

(73) Assignee: Sound Solutions International Co., Ltd., Beijing (CN)

( * ) Notice: Subject to any disclaimer, the term of this patent is extended or adjusted under 35 U.S.C. 154(b) by 316 days.

(21) Appl. No.: 14/023,727

(22) Filed: Sep. 11, 2013

(65) Prior Publication Data
US 2015/0072723 A1 Mar. 12, 2015

(51) Int. Cl.
*H04R 25/00* (2006.01)
*H04R 1/28* (2006.01)
*H04M 1/03* (2006.01)
*H04R 1/02* (2006.01)

(52) U.S. Cl.
CPC ............ *H04R 1/288* (2013.01); *H04M 1/035* (2013.01); *H04R 1/02* (2013.01); *H04R 1/2803* (2013.01); *H04R 2201/029* (2013.01)

(58) Field of Classification Search
CPC ...... H04R 1/2803; H04R 1/288; H04R 1/025; H04R 1/225; H04R 1/2819; H04R 1/2834; H04R 1/2842; H04R 2201/029; H04R 2499/11; H04R 2499/13; H04R 9/02; H04M 1/035; H04M 1/18; H04M 1/185; H04N 5/2252
USPC ......... 381/346, 348, 353, 354, 345, 332, 87, 381/190; 181/151, 199; 1/1; 455/575.1, 455/566
See application file for complete search history.

(56) References Cited

U.S. PATENT DOCUMENTS

| 4,044,855 | A | * | 8/1977 | Kobayashi | H04R 1/22 181/151 |
| 4,101,736 | A | * | 7/1978 | Czerwinski | H04R 1/2803 181/151 |
| 4,356,882 | A | * | 11/1982 | Allen | H04R 1/2803 181/151 |
| 6,073,723 | A | * | 6/2000 | Gallo | H04R 1/288 181/146 |
| 6,338,395 | B1 | * | 1/2002 | Setiabudi | H04R 1/288 181/151 |

(Continued)

FOREIGN PATENT DOCUMENTS

EP 2424270 A1 2/2012

*Primary Examiner* — Davetta W Goins
*Assistant Examiner* — Phylesha Dabney
(74) *Attorney, Agent, or Firm* — Steven McMahon Zeller; Dykema Gossett PLLC

(57) ABSTRACT

An audio system that comprises an electro-acoustic transducer mounted onto a housing that forms a resonance volume which is at least partially filled with sound absorbing material, wherein the housing is realized with a deep-drawn foil at least partially filled with grains of the sound absorbing material.

17 Claims, 2 Drawing Sheets

(56) References Cited

U.S. PATENT DOCUMENTS

| | | | |
|---|---|---|---|
| 7,974,423 B2* | 7/2011 | Matsumura | H04R 1/2803 181/149 |
| 8,320,598 B2* | 11/2012 | Rouvala | H04R 1/22 381/345 |
| 9,020,177 B2* | 4/2015 | Cohen | H04R 1/2857 381/333 |
| 9,099,073 B2* | 8/2015 | Papakyriacou | H04R 1/2803 |
| 2008/0170737 A1* | 7/2008 | Saiki | H04R 1/2803 381/346 |
| 2009/0245562 A1* | 10/2009 | Saiki | H04R 1/2803 381/345 |
| 2012/0025874 A1 | 2/2012 | Saikaku et al. | |
| 2014/0152890 A1* | 6/2014 | Rayner | G06F 1/1626 348/376 |

* cited by examiner

SPEAKER WITH GRAINED ZEOLITE MATERIAL IN DEEP-DRAWN FOIL RESONANCE VOLUME

FIELD OF THE INVENTION

The present invention generally relates to an audio system that comprises an electro-acoustic transducer mounted onto a housing that forms a resonance volume which is at least partially filled with sound absorbing material.

BACKGROUND OF THE INVENTION

Document WO 2012/025874 A1, the entire disclosure of which is hereby incorporated by reference, discloses an audio system that comprises an electro-acoustic transducer or speaker with a housing that forms a resonance volume to improve the quality of the emitted sound. Such speakers are used in mobile devices and there is a continuous need to reduce the size of the housing of the audio system as much as possible while keeping the quality of the audio parameters of the speaker and of the sound emitted. Mobile phone manufacturer define the volume and size of the recess for the audio system in the mobile phone where the speaker with its housing has to fit in. The audio system disclosed in WO 2012/025874 A1 comprises a granulate of ball shaped zeolite material that fills part of the resonance volume. Zeolite material is a sound absorbing material which results in a virtual acoustic enlargement of the volume of the resonance space by at least a factor 2. As a result, the volume of the housing of the speaker that comprises the block of zeolite material can be made smaller compared to a housing of a speaker filled with air.

The housing of a speaker like the housing of a mobile phone nowadays is realized by injection molding of plastic material pressed into an injection mold while the plastic is heated up and moldable. For every change of the form of the housing a new injection mold has to be manufactured what takes some weeks of work with high cost involved.

SUMMARY OF THE INVENTION

It is an object of the invention to provide a small size audio system for mobile devices that enables quick and cost sensitive adaptation to the dimensions of the recess for the audio system in all kind of different mobile devices. This object is achieved with an audio system wherein the housing is realized with a deep-drawn foil at least partially filled with grains of the sound absorbing material.

The use of the deep-drawn foil technology for a housing that forms the resonance volume for a speaker in an audio system comprises several advantages. The form of the housing can be adapted in the manufacturing process within hours and costs to realize such a new form are low. Furthermore the wall thickness of deep-drawn foil is less than the wall thickness of a typical wall of a molded housing of a speaker. This reduces the weight and volume needed for the audio system in the mobile device.

The combination of the use of a deep-drawn foil housing filled with grains of sound absorbing material enables the advantage that the grains fill up most if not all of the volume of the housing and therefore enlarge virtually the available back volume for the speaker. The nearly completely with grain of the sound absorbing material filled up housing in addition to that adds up to the mechanical stability of the housing with its thin walls made of deep-drawn foil.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 1:
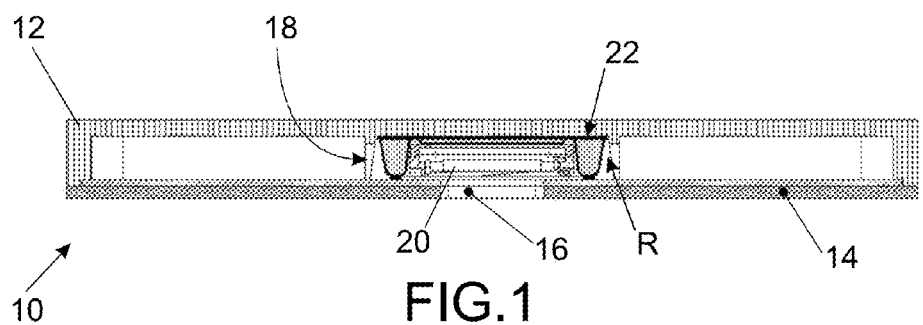
FIG. 1 shows a sectional view of one embodiment of a mobile phone having an audio system.

FIG. 1 shows a mobile phone 10 in a sectional drawing. The mobile phone 10 comprises a phone housing 12 and a display 14 having a sound opening 16. A recess R is formed in the mobile phone 10 for placement of an audio system 18. The audio system 18 comprises an electro-acoustic transducer or speaker 20 mounted onto a housing 22. The housing 22 is configured to hold the speaker 20 within the recess R of the mobile phone 10, and forms a resonance volume 24 for the speaker 20 to enhance the acoustic performance of the speaker 20.

Figure 2:
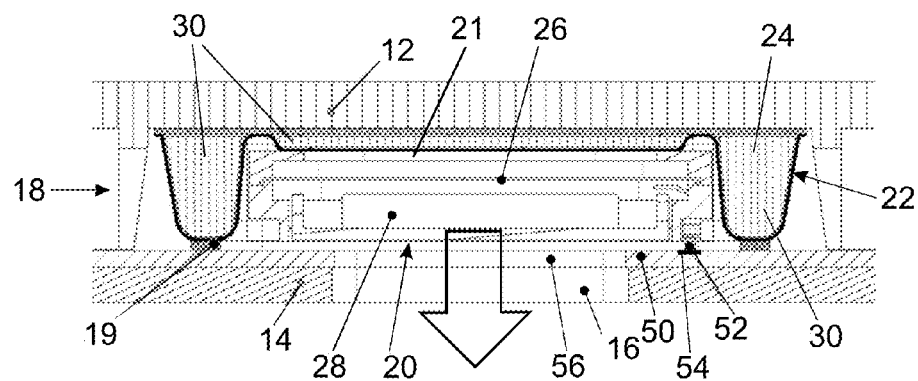
FIG. 2 shows a detailed sectional view of the audio system in the mobile phone of FIG. 1.

FIG. 2 shows a sectional view of the audio system 18 according to FIG. 1. The speaker 20 comprises a membrane 26 on a top side 21 of the speaker 20 and a magnet 28 on the opposite side. The speaker 20 is mounted onto the housing 22 on its top side 21.

To enable a small size of the housing 22 the resonance volume 24 is filled up with sound absorbing material 30. The use of sound absorbing material results in a virtual acoustic enlargement of the resonance volume 24 by at least a factor 2. The sound absorbing material 30 can be a grained zeolite, which is filled into the hollow areas of the resonance volume 24. This provides the advantage that sound absorbing material almost fills up the complete resonance volume 24, what increases virtually the acoustic resonance volume.

Figure 3:
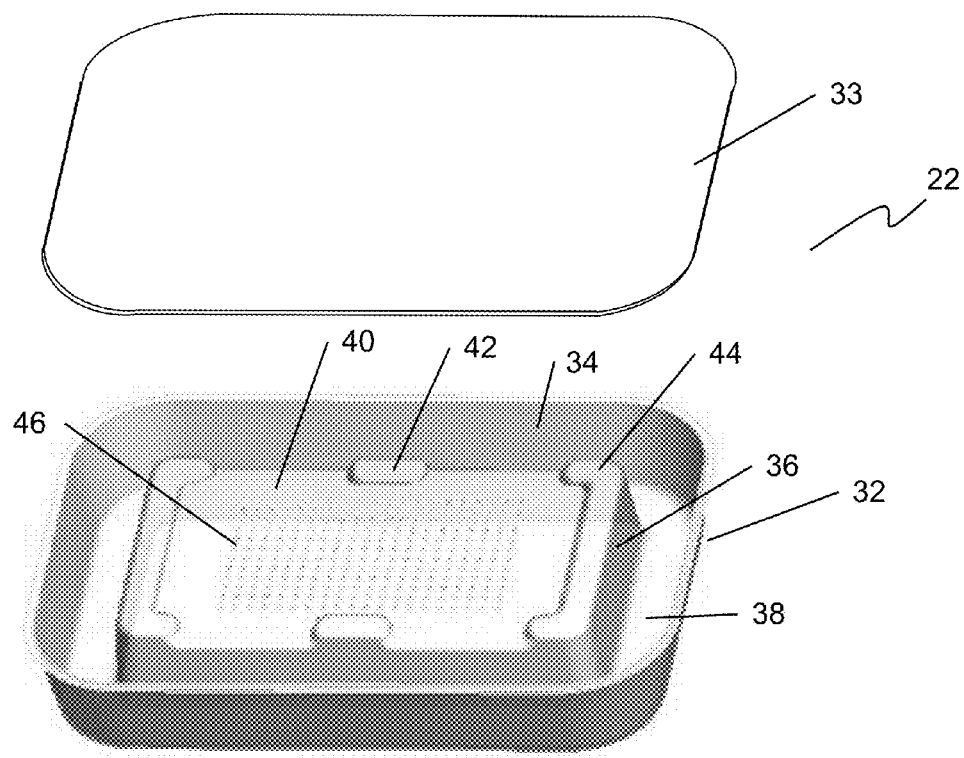
FIG. 3 shows an exploded isometric view of one embodiment of a housing for an audio system.
Figure 4:
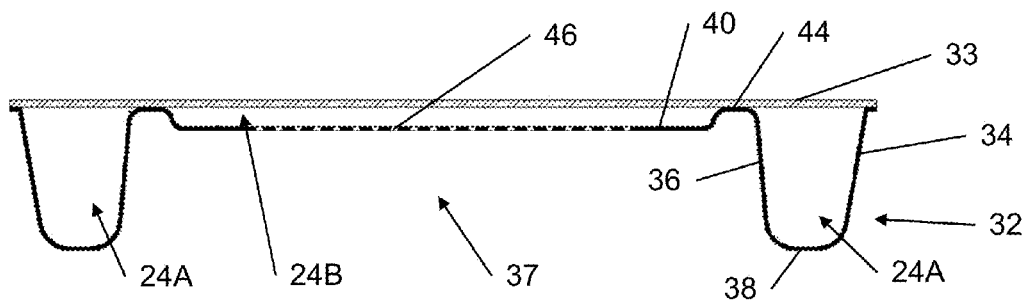
FIG. 4 shows a detailed sectional view of the housing for an audio system illustrated in FIG. 3.

FIG. 3 shows an isometric view of one embodiment of the housing 22 of the audio system 18 while FIG. 4 shows a sectional view of the housing 22. According to an embodiment, the housing 22 is formed with a deep-drawn foil, which for instance may be a polypropylene. The housing 22 comprises a base element 32 of deep-drawn foil and a cap element 33 of planar foil that is configured to be fixed to the base element 32. The base element 32 is comprised of an outer sidewall 34, which forms an enclosure around the periphery of the base element 32, and an inner sidewall 36 located interior to and offset from the outer sidewall 34. Located between outer sidewall 34 and inner sidewall 36, and connected to the bottom of each sidewall, is a bottom surface 38. The outer sidewall 34, inner sidewall 36 and bottom surface 38 define a space 24A which defines a portion of the resonance volume 24.

A top surface 40 of the base element 32 is located inside of the inner sidewall 36, toward the center of the base element 32. On the opposite side of the base element 32, in the space defined by the opposite sides of the inner sidewall 36 and top surface 40, is a speaker receptacle space 37, as shown in FIG. 4. The speaker 20 shown in FIG. 2 is mounted into the housing 22 within the speaker receptacle space 37. The height of the top surface 40, as measured from the bottom surface 38, is less than the height of the outer sidewall 34. A plurality of raised protuberances 42, 44 are located on the top surface 40 and spaced apart around its outer edge in proximity to the top of the inner sidewall 36. The height of the protuberances 42, 44 from the bottom surface is substantially the same as the height of the outer sidewalls 34. The cap element 33 engages the top of the outer sidewall 34 and the protuberances 42, 44 when placed on the base element 32, as can be seen in FIG. 4. When the cap element 33 is engaged on the base element 32, a space 24B is created between the cap element 33 and the top surface 40, which also partially defines the resonance volume 24. The cap element 33 also closes off the space 24A, thus closing off all of the resonance volume 24 and helping to contain the sound absorbing material 30 inside the resonance volume 24. The spaces between the plurality of protuberances 42, 44 allow the spaces 24A, 24B of the resonance space 24 to be in fluid communication with each other.

To enable air pressure or sound from membrane 24 of the speaker 20 to get into the resonance volume 24 of the housing 22, the top surface 40 comprises a plurality of sound openings 46, as shown in FIGS. 3 and 4.

In the embodiment described and shown in the figures, the housing 22 is of a generally rectangular shape and the inner sidewall 36 forms a generally rectangular shaped speaker receptacle space 37. Further, two protuberances 42 are shown along the short sides of the top surface 40 and two protuberances 44 are shown at the midpoints along the longer sides of top surface 40. However, it should be obvious that other shapes for the housing 22 are possible and contemplated by this invention. Likewise, the invention contemplates different numbers and configurations of protuberances 42, 44 around the top surface 40.

Housings of prior art audio systems are realized by injection molding of plastic material pressed into an injection mold while the plastic is heated up and moldable. The use of the deep-drawn foil technology for the housing 22 that forms the resonance volume 24 for the speaker 20 in the audio system 18 provides several advantages over housings of the prior art. The form of the housing 22 can be adapted in the manufacturing process within hours and costs to realize such a new form are low. Furthermore the wall thickness of deep-drawn foil is less than the wall thickness of a typical wall of a molded housing of a speaker. This reduces the weight and volume needed for the audio system 18 in the mobile phone 10. The combination of the use of a deep-drawn foil housing 22 filled with grains of sound absorbing material 30 adds to the mechanical stability of the housing 22 with its thin walls made of foil.

The audio system 18 furthermore comprises a printed circuit board 50 with electrical components for sound signal processing. Electrical spring force contacts 52 are located on the magnet 28 side of speaker 20 and are configured to connect to contact areas 54 located on the printed circuit board 50. The printed circuit board 50 furthermore comprises at least one sound opening 56 in the area of the magnet 28 of the speaker 20. This mechanical arrangement of the audio system 18 within the mobile phone 10 enables a good sound creation and use of the resonance volume 24 while keeping the recess R and the volume needed for the audio system 18 small within the mobile phone 10.

Sealing foam 58 is applied between the housing 22 and the printed circuit board 50 to guide the sound from the speaker 20 into the sound openings 56 and 16. The housing of the audio system according to this invention may be formed in various shapes and sizes, based on volume requirements or acoustic performance requirements.

According to another embodiment of the invention the cap element of the housing could be formed of a deep-drawn foil as well. Furthermore the housing made of deep-drawn foil could be formed out of three or more elements made of planar and/or deep-drawn foil fixed together with any kind of glue or just by putting them together while heated up.

Practical tests showed that at least 50 percent of the resonance volume 24 should be filled-up with sound absorbing material 30, but for improved performance 80 percent or even all of the resonance volume 24 should be filled-up. If present, any remaining resonance volume 24 of the housing 22 not filled with sound absorbing material 30 can be filled-up with volume expanding material like foam. This provides the advantage that the grained zeolite material 30 does not generate sound if the mobile phone 10 is shaken. But for some embodiments the remaining resonance volume 24 of the housing 22 will not be filled with foam at all.

The speaker 20 could be mounted onto the housing 22 on its magnet side as well, although mounting of the speaker on its membrane side showed better performance in small size mobile phones. This construction furthermore enables to fix the speaker 20 with its contacts 52 on the printed circuit board 50 and to better cool the speaker 20 while in use. The sound openings 46 are best realized as micro pores burned into the base element 32 with a laser. Practical tests have shown that the thickness of the wall of the housing can be realized with 0.5 mm or even thinner.

The inventive audio system with a housing realized with a deep-drawn foil and filled with grains of sound absorbing material could be used in any kind of device, not only mobile phones.

What is claimed is:

1. An audio system, the audio system comprising:
    an electro-acoustic transducer; and
    a housing, the housing comprising:
        a continuous wall material defining a first well on a first side and a second well on a second side, the second side being opposite the first side and the second well surrounding the first well;
        a speaker receptacle space located in the first well of the continuous wall material, the speaker receptacle space being configured to hold the electro-acoustic transducer; and
        a resonance volume separated from the speaker receptacle space, the resonance volume defined in part by the second well of the continuous wall material and being at least partially filled with grains of sound absorbing material,
    wherein the electro-acoustic transducer is mounted to the housing in the speaker receptacle space.

2. The audio system according to claim 1, wherein the housing further comprises
    a cap element affixed to the continuous wall material, and wherein the resonance volume is defined in part by the cap element.

3. The audio system according to claim 2, wherein the continuous wall material is formed of a deep-drawn foil and the cap element is formed of a planar foil.

4. The audio system according to claim 3, wherein the deep-drawn foil is a polypropylene.

5. The audio system according to claim 1, wherein the electro-acoustic transducer comprises:
    a membrane located on one side of the electro-acoustic transducer; and
    a magnet on the opposite side of the electro-acoustic transducer, wherein the electro-acoustic transducer is mounted to the housing on its membrane side.

6. The audio system according to claim 5, wherein the housing further comprises at least one sound opening proximate to the membrane, the at least one sound opening allowing for the transmission of sound from the membrane to the resonance volume.

7. The audio system according to claim 1, wherein the sound absorbing material is a grained zeolite material.

8. The audio system according to claim 1, wherein the electro-acoustic transducer comprises at least one electrical contact and the audio system further comprising:
a printed circuit board comprising:
at least one electrical component for sound signal processing;
at least one sound opening; and
at least one contact area configured for electrical connection to the electro-acoustic transducer,
wherein the at least one electrical contact of the electro-acoustic transducer is electrically connected to the at least one contact area of the printed circuit board.

9. The audio system according to claim 1, wherein at least half of the resonance volume contains the sound absorbing material.

10. The audio system according to claim 1, wherein at least 80% of the resonance volume contains the sound absorbing material.

11. The audio system according to claim 1, wherein all of the resonance volume contains the sound absorbing material.

12. The audio system according to claim 1, wherein the resonance volume is further partially filled with a volume expanding material.

13. A mobile phone having an audio system to emit acoustic sound, the mobile phone comprising a phone housing, the phone housing being configured with a recess for placement of the audio system, the audio system comprising:
an electro-acoustic transducer; and
an audio system housing, the audio system housing comprising:
a continuous wall material defining a first well on a first side and a second well on a second side, the second side being opposite the first side and the second well surrounding the first well;
a speaker receptacle space located in the first well of the continuous wall material, the speaker receptacle space being configured to hold the electro-acoustic transducer; and
a resonance volume, the resonance volume being defined in part by the second well of the continuous wall material and separated from the speaker receptacle space, wherein the resonance volume is least partially filled with grains of sound absorbing material,
wherein the electro-acoustic transducer is mounted to the audio system housing in the speaker receptacle space.

14. The mobile phone according to claim 13, further comprising a display connected to the phone housing, the display comprising at least one sound opening located in the vicinity of the speaker receptacle space, wherein sound from the audio system is capable of being emitted through the at least one sound opening in the display.

15. An audio system housing, the housing comprising:
a base element comprising:
an outer sidewall located along the periphery of the base element and defining a first enclosure;
an inner sidewall, located interior to and offset from the outer sidewall and defining a second enclosure;
a bottom surface located between the outer sidewall and the inner sidewall, the bottom surface connected to the bottom of the outer sidewall and the bottom of the inner sidewall; and
a top surface located interior to the inner sidewall and connected on all sides to the top of the inner sidewall, wherein the height of the top surface above the bottom surface is less than the height of the outer sidewall above the bottom surface, and
a cap element attached to the base element and configured to engage the top of the outer sidewall;
wherein the second enclosure defines a speaker receptacle space configured to hold an electro-acoustic transducer, and
wherein the first enclosure and a space between the top surface and the cap element defines a resonance volume separated from the speaker receptacle space, the resonance volume configured to hold grains of a sound absorbing material.

16. The audio system according to claim 15, wherein a plurality of spaced apart protuberances are located along the outer edge of the top surface and wherein the height of the protuberances above the bottom surface is substantially the same as the height of the outer sidewall above the bottom surface.

17. The audio system according to claim 16, wherein the cap element is configured to be in contact with the plurality of protuberances when the cap element is fixed to the base element.

* * * * *